(12) United States Patent
Kawabata et al.

(10) Patent No.: US 12,077,666 B2
(45) Date of Patent: Sep. 3, 2024

(54) RESIN COMPOSITION, CURED PRODUCT, MOLDING AND METHOD FOR PRODUCING SAME, AND FILM CAPACITOR AND METHOD FOR PRODUCING SAME

(71) Applicant: HITACHI CHEMICAL COMPANY, LTD., Tokyo (JP)

(72) Inventors: Yasunori Kawabata, Tokyo (JP); Kasumi Nakamura, Tokyo (JP); Tatsuhito Fukuhara, Tokyo (JP); Takahide Iwaya, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 658 days.

(21) Appl. No.: 16/759,630

(22) PCT Filed: Sep. 28, 2018

(86) PCT No.: PCT/JP2018/036479
§ 371 (c)(1),
(2) Date: Jul. 16, 2020

(87) PCT Pub. No.: WO2019/087641
PCT Pub. Date: May 9, 2019

(65) Prior Publication Data
US 2020/0347222 A1 Nov. 5, 2020

(30) Foreign Application Priority Data
Oct. 30, 2017 (WO) .................. PCT/JP2017/039161

(51) Int. Cl.
*C08L 63/00* (2006.01)
*C08K 3/04* (2006.01)
(Continued)

(52) U.S. Cl.
CPC .............. *C08L 63/00* (2013.01); *H01G 4/224* (2013.01); *C08K 3/042* (2017.05);
(Continued)

(58) Field of Classification Search
CPC ...... C08L 63/00–10; C08K 3/04; C08K 3/042
See application file for complete search history.

(56) References Cited

U.S. PATENT DOCUMENTS 6,472,070 B1* 10/2002 Muraoka .................. C08K 3/04
252/609
11,339,284 B2* 5/2022 Nakamura ............. C08K 3/013
(Continued)

FOREIGN PATENT DOCUMENTS

CN     1643717 A     7/2005
CN   108192317 A  *  6/2018
(Continued)

OTHER PUBLICATIONS

Machine Translation of JP-4201925-B2 (Year: 2008).*
(Continued)

*Primary Examiner* — Kregg T Brooks
*Assistant Examiner* — David R. Foss
(74) *Attorney, Agent, or Firm* — FITCH, EVEN, TABIN & FLANNERY, LLP

(57) ABSTRACT

A resin composition for casting, containing a curable component and expandable graphite. A molded body including an element and a sealing portion that seals the element, in which the sealing portion contains the resin composition or a cured product thereof.

17 Claims, 3 Drawing Sheets

(51) Int. Cl.

| | | |
|---|---|---|
| *C08K 3/22* | (2006.01) | |
| *C08K 3/36* | (2006.01) | |
| *C08K 5/3492* | (2006.01) | |
| *C08K 7/22* | (2006.01) | |
| *H01G 4/224* | (2006.01) | |
| *C08L 63/10* | (2006.01) | |

(52) U.S. Cl.
CPC ........ *C08K 2003/2227* (2013.01); *C08K 3/36* (2013.01); *C08K 5/34922* (2013.01); *C08K 7/22* (2013.01); *C08K 2201/005* (2013.01); *C08L 63/10* (2013.01)

(56) References Cited

U.S. PATENT DOCUMENTS

| | | | |
|---|---|---|---|
| 2004/0198925 A1 | 10/2004 | Morita et al. | |
| 2008/0166484 A1* | 7/2008 | Smith | C08K 3/32 524/417 |
| 2010/0227952 A1* | 9/2010 | Futterer | C08K 5/34928 524/13 |
| 2012/0261807 A1* | 10/2012 | Itoh | H01L 23/293 257/676 |
| 2013/0115442 A1* | 5/2013 | Sang | B32B 7/12 977/773 |
| 2015/0017450 A1 | 1/2015 | Oka | |
| 2017/0253691 A1 | 9/2017 | Shimamoto | |
| 2020/0347222 A1 | 11/2020 | Kawabata | |

FOREIGN PATENT DOCUMENTS

| | | | |
|---|---|---|---|
| JP | H2-097553 A | 4/1990 | |
| JP | H3-000793 A | 1/1991 | |
| JP | H7-161578 A | 6/1995 | |
| JP | 2000-055293 A | 2/2000 | |
| JP | 2000143941 A * | 5/2000 | |
| JP | 2001-114990 A | 4/2001 | |
| JP | 2003-147052 A | 5/2003 | |
| JP | 2003-218249 A | 7/2003 | |
| JP | 2004-283732 A | 10/2004 | |
| JP | 2005-072399 A | 3/2005 | |
| JP | 2006-213786 A | 8/2006 | |
| JP | 2007-314793 A | 12/2007 | |
| JP | 4201925 B2 * | 12/2008 | ............. H01C 1/028 |
| JP | 2009-170882 A | 7/2009 | |
| JP | 2010-077303 A | 4/2010 | |
| JP | 2010-235842 A | 10/2010 | |
| JP | 2011-077154 A | 4/2011 | |
| JP | 2012-214777 A | 11/2012 | |
| JP | 2012-234932 A | 11/2012 | |
| JP | 2019-054350 A | 3/2019 | |
| WO | 2007/100078 A1 | 9/2007 | |
| WO | 2009/047886 A1 | 4/2009 | |
| WO | WO-2015007629 A1 * | 1/2015 | ............. C08K 13/02 |

OTHER PUBLICATIONS

Machine Translation of CN-108192317-A (Year: 2018).*
Machine translation of JP-2000143941-A from Espacenet (Year: 2000).*
Machine Translation of JP 2010-77303. (Year: 2010) (cited in copending U.S. Pat. No. 11,339,284).

* cited by examiner (a)

(b)

(b)

(c)

RESIN COMPOSITION, CURED PRODUCT, MOLDING AND METHOD FOR PRODUCING SAME, AND FILM CAPACITOR AND METHOD FOR PRODUCING SAME

CROSS-REFERENCE TO RELATED APPLICATIONS

This application is a U.S. national phase application filed under 35 U.S.C. § 371 of International Application No. PCT/JP2018/036479, filed Sep. 28, 2018, designating the United States which claims priority from International Application no. PCT/JP2017/039161, filed Oct. 30, 2017, which are hereby incorporated herein by reference in their entirety.

TECHNICAL FIELD

The present invention relates to a resin composition, a cured product, a molded body, a method for producing the molded body, a film capacitor, and a method for producing the film capacitor.

BACKGROUND ART

Electronic components such as a film capacitor are used in, for example, power converters (power conditioners) in solar cells, industrial equipment, electric cars, and the like. A molded body used as an electronic component includes, for example, an element and a sealing portion that seals the element. For example, a film capacitor includes a film capacitor element and a sealing portion that seals the film capacitor element, and the film capacitor can be obtained by disposing the film capacitor element in a space of a mold member having a space for accommodating the film capacitor element, subsequently supplying a sealing material into the space to form the sealing portion (see, for example, the following Patent Literature 1). As the sealing portion, a cured product of a curable resin composition containing a resin material can be used.

CITATION LIST

Patent Literature

Patent Literature 1: Japanese Unexamined Patent Publication No. H7-161578

SUMMARY OF INVENTION

Technical Problem

From the viewpoint of suppressing deterioration of an element in a molded body including a sealing portion that seals the element, it is desirable to suppress the infiltration of moisture from the outside into the sealing portion. Therefore, the cured product used as the sealing portion is required to have a low water absorption rate and is further required to have a low water absorption rate while achieving excellent flame retardancy and heat resistance. Particularly, a cured product of a resin composition for casting is required to have a low water absorption rate while achieving excellent flame retardancy and heat resistance.

The present invention has been achieved in view of such circumstances, and it is an object of the invention to provide a resin composition from which it is possible to obtain a cured product having a low water absorption rate while having excellent flame retardancy and heat resistance, and a cured product of the resin composition. Furthermore, it is another object of the present invention to provide a molded body that uses the resin composition or a cured product thereof, and a method for producing the molded body. In addition, it is another object of the present invention to provide a film capacitor that uses the resin composition or a cured product thereof, and a method for producing the film capacitor.

Solution to Problem

The resin composition of the present invention is a resin composition for casting, containing a curable component and expandable graphite.

According to the resin composition of the present invention, a cured product having a low water absorption rate while having excellent flame retardancy and heat resistance can be obtained. In a case in which the water absorption rate is low as such, deterioration of an element can be suppressed in a molded body containing a cured product of such a resin composition as a sealing portion that seals the element. In addition, according to the resin composition of the present invention, it is possible to maintain the viscosity of the resin composition low even in a case in which a solvent is not used, and the filling workability of the resin composition is excellent at the time of casting the resin composition.

It is preferable that a major axis of the expandable graphite is 800 μm or less.

It is preferable that the curable component includes an epoxy resin.

It is preferable that a viscosity of the resin composition in a case in which the viscosity is measured using a B type viscometer under the conditions of 40° C. and 60 rpm is 8.0 Pa·s or less.

The cured product of the present invention is a cured product of the above-mentioned resin composition.

A molded body of the present invention includes an element and a sealing portion that seals the element, and the sealing portion contains the above-mentioned resin composition or a cured product thereof. In a method for producing a molded body of the present invention, a molded body is obtained by casting the above-mentioned resin composition.

A film capacitor of the present invention includes a film capacitor element and a sealing portion that seals the film capacitor element, and the sealing portion contains the above-mentioned resin composition or a cured product thereof. In a method for producing a film capacitor of the present invention, a film capacitor including a sealing portion that seals a film capacitor element is obtained by casting the above-mentioned resin composition.

Advantageous Effects of Invention

According to the present invention, a cured product having a low water absorption rate while having excellent flame retardancy and heat resistance can be obtained. In addition, according to the present invention, it is possible to maintain the viscosity of the resin composition low even in a case in which a solvent is not used, and the filling workability of the resin composition is excellent at the time of casting the resin composition. According to the present invention, application of the resin composition to casting can be provided.

DESCRIPTION OF EMBODIMENTS

Figure 1:
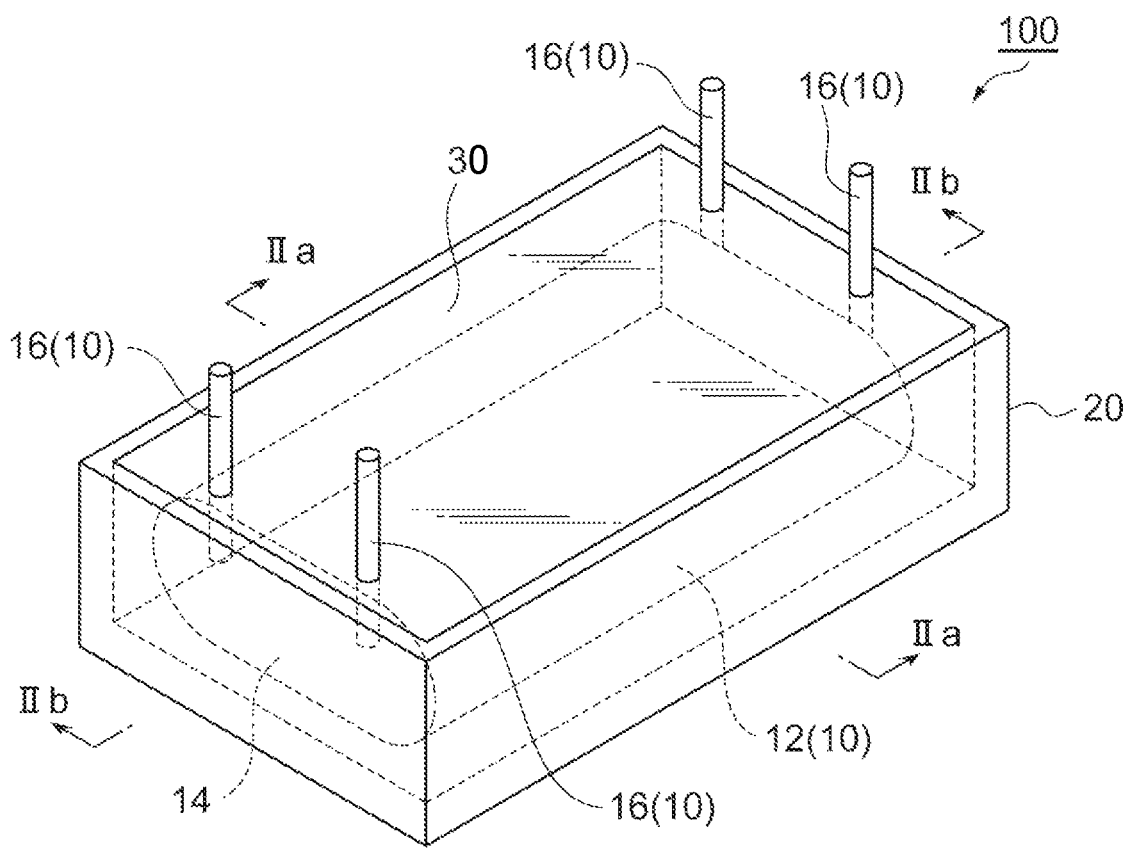
FIG. 1 is a perspective view illustrating a molded body of an embodiment of the present invention.

Hereinafter, embodiments of the present invention will be described in detail. However, the present invention is not intended to be limited to the following embodiments.

In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in the examples. "A or B" may include either one of A and B, and may also include both of A and B. Materials listed as examples in the present specification can be used singly or in combinations of two or more, unless otherwise specifically indicated.

In the present specification, when a plurality of substances corresponding to each component exist in the composition, the content of each component in the composition means the total amount of the plurality of substances that exist in the composition, unless otherwise specified.

<Resin Composition and Cured Product>

The resin composition of the present embodiment is a resin composition for casting. A molded body can be obtained by casting the resin composition of the present embodiment. The resin composition of the present embodiment is a curable (for example, thermosetting) resin composition. The cured product of the present embodiment is a cured product of the resin composition of the present embodiment and can be obtained by curing the curable resin composition. The resin composition of the present embodiment and a cured product thereof exhibits, for example, black color. The cured product of the present embodiment can be used as a sealing portion that seals an element. By sealing an element using a sealing portion, deterioration of the element by moisture and the like can be suppressed.

The resin composition of the present embodiment contains a curable component and expandable graphite. According to the resin composition of the present embodiment, a cured product having a low water absorption rate while having excellent flame retardancy and heat resistance can be obtained. The reason why such an effect is exhibited is not necessarily clearly known; however, the inventors suspect as follows.

That is, in the expandable graphite, carbon atoms form a crystal structure called hexagonal crystal system, and the expandable graphite does not have hydrophilic polar groups. Therefore, since it does not have a chemical structure that is capable of adsorption or retention of water, a cured product having a low water absorption rate can be obtained. By using such expandable graphite, a cured product having a low water absorption rate while having excellent flame retardancy and heat resistance can be obtained.

(Curable Component)

The curable component can include, for example, a curable resin and a curing agent. In a case in which a curable resin can be cured without using a curing agent, a curing agent may not be used.

As the curable component, it is possible to use a thermosetting component or a photocurable component, and as the curable resin, a thermosetting resin or a photocurable resin can be used. As the curable component, from the viewpoint of excellent curability, a thermosetting component is preferred. Examples of the thermosetting resin include an epoxy resin, a urea resin, a melamine resin, a polyester, a silicone resin, and a polyurethane. Examples of the photocurable resin include an acrylic resin and a methacrylic resin. From the viewpoint that the moisture permeability of the cured product is low, and deterioration of the element is easily prevented when an element is sealed by the cured product, it is preferable that the curable component includes an epoxy resin.

As the epoxy resin, a resin having two or more glycidyl groups in one molecule can be used. Examples of the epoxy resin include a bisphenol A type epoxy resin, a bisphenol AP type epoxy resin, a bisphenol AF type epoxy resin, a bisphenol B type epoxy resin, a bisphenol BP type epoxy resin, a bisphenol C type epoxy resin, a bisphenol E type epoxy resin, a bisphenol F type epoxy resin, a bisphenol G type epoxy resin, a bisphenol M type epoxy resin, a bisphenol S type epoxy resin, a bisphenol P type epoxy resin, a bisphenol PH type epoxy resin, a bisphenol TMC type epoxy resin, a bisphenol Z type epoxy resin, a bisphenol S type epoxy resin (hexanediol bisphenol S diglycidyl ether or the like), a novolac phenol type epoxy resin, a biphenyl type epoxy resin, a naphthalene type epoxy resin, a dicyclopentadiene type epoxy resin, a bixylenol type epoxy resin (bixylenol diglycidyl ether or the like), a hydrogenated bisphenol A type epoxy resin (hydrogenated bisphenol A glycidyl ether or the like), dibasic acid-modified diglycidyl ether type epoxy resins of these resins, and an aliphatic epoxy resin.

From the viewpoint that the moisture permeability of the cured product is low, and deterioration of the element is easily prevented when an element is sealed by the cured product, the content of the epoxy resin is preferably 50% by mass or more, more preferably 80% by mass or more, and even more preferably 90% by mass or more, based on the total mass of the curable resin. The content of the epoxy resin may be 100% by mass based on the total mass of the curable resin.

The content of the curable resin is preferably in the following range based on the total mass of the resin composition (excluding the mass of a solvent). From the viewpoint that an excessive increase in the viscosity of the resin composition is suppressed, and thereby handling of the resin composition is easy (workability is easily secured), the content of the curable resin is preferably 10% by mass or more, more preferably 15% by mass or more, even more preferably 18% by mass or more, and particularly preferably 20% by mass or more. From the viewpoint that a cured product having a low water absorption rate is easily obtained, the content of the curable resin is preferably 60% by mass or less, more preferably 50% by mass or less, even more preferably 40% by mass or less, and particularly preferably 30% by mass or less. From these viewpoints, the content of the curable resin is preferably 10% to 60% by mass.

As the curing agent, a compound having two or more of a functional group that reacts with a glycidyl group in one molecule can be used. Examples of the curing agent include a phenolic resin and an acid anhydride.

As the phenolic resin, a resin having two or more phenolic hydroxyl groups in one molecule can be used. Examples of the phenolic resin include a resin obtainable by condensing or co-condensing a phenol compound and/or a naphthol compound with an aldehyde compound in the presence of an acidic catalyst, a biphenyl skeleton type phenolic resin, a paraxylylene-modified phenolic resin, a metaxylylene-paraxylylene-modified phenolic resin, a melamine-modified phenolic resin, a terpene-modified phenolic resin, a dicyclopentadiene-modified phenolic resin, a cyclopentadiene-modified phenolic resin, a polycyclic aromatic ring-modified phenolic resin, and a xylylene-modified naphthol resin. Examples of the phenol compound include phenol, cresol, xylenol, resorcinol, catechol, bisphenol A, and bisphenol F. Examples of the naphthol compound include α-naphthol, β-naphthol, and dihydroxynaphthalene. Examples of the aldehyde compound include formaldehyde, acetaldehyde, propionaldehyde, benzaldehyde, and salicylaldehyde.

Examples of the acid anhydride include methyltetrahydrophthalic anhydride, methylhexahydrophthalic anhydride, phthalic anhydride, hexahydrophthalic anhydride, endomethylenetetrahydrophthalic anhydride, dodecenylsuccinic anhydride, and octenylsuccinic anhydride.

From the viewpoint that excellent strength of the cured product is easily obtained, and from the viewpoint that the moisture permeability of the cured product is low, and deterioration of the element is easily prevented when an element is sealed by the cured product, the content of the curing agent is preferably 10% to 55% by mass, more preferably 12% to 40% by mass, and even more preferably 15% to 30% by mass, based on the total mass of the resin composition (excluding a solvent such as an organic solvent).

The curable component may include a curing accelerator. Examples of the curing accelerator include a quaternary ammonium salt, an amine-based curing accelerator, and a phosphorus-based curing accelerator. Examples of the amine-based curing accelerator include an imidazole compound, an aliphatic amine, an aromatic amine, a modified amine, and a polyamide resin. Examples of the phosphorus-based curing accelerator include a phosphine oxide, a phosphonium salt, and a diphosphine.

(Expandable Graphite)

Expandable graphite is a material in which the crystal structure of graphite is expanded between layers, and for example, it is a graphite intercalation compound formed by intercalating a substance other than graphite into between layers of graphite. Expandable graphite can be obtained by, for example, immersing a graphite material in an acid (sulfuric acid, nitric acid, or the like). Expandable graphite represents expandable graphite that is obtained by performing an acid treatment, and is distinguished from expanded graphite that is obtained by heat-treating expandable graphite.

From the viewpoint that an excessive increase in the viscosity of the resin composition is suppressed, and thereby handling of the resin composition is easy (workability is easily secured), the major axis of the expandable graphite is preferably 2 μm or more, more preferably 5 μm or more, even more preferably 10 μm or more, particularly preferably 12 μm or more, extremely preferably 50 μm or more, highly preferably 100 μm or more, still more preferably more than 100 μm, even more preferably 150 μm or more, and particularly preferably 200 μm or more. The major axis of the expandable graphite may be more than 200 μm, may be 300 μm or more, may be 400 μm or more, may be 500 μm or more, and may be 600 μm or more. From the viewpoint that the expandable graphite is easily dispersed in the resin composition, the major axis of the expandable graphite is preferably 800 μm or less, more preferably 500 μm or less, even more preferably 200 μm or less, and particularly preferably 100 μm or less. From these viewpoints, the major axis of the expandable graphite is preferably 5 to 800 μm. It is preferable that the average major axis of the expandable graphite is also in these ranges.

The major axis of the expandable graphite can be obtained by, for example, the following procedure. Expandable graphite as an object of measurement is dispersed in a curable component, thereby a cured product is produced, and then the cured product is cut such that the expandable graphite is exposed. Next, the cut surface is polished until the major axis of the expandable graphite (maximum length of the expandable graphite as a whole) can be identified. Then, the cut surface is observed using a scanning electron microscope (SEM) or an optical microscope, and the major axis of the expandable graphite is measured. Even in a case in which the expandable graphite is not dispersed in the cured product, the major axis of the expandable graphite can be obtained using a scanning electron microscope or an optical microscope. That is, after an observed image of the expandable graphite alone is obtained using a scanning electron microscope or an optical microscope, the maximum length of the expandable graphite as a whole in the observed image can be acquired as the major axis of the expandable graphite.

The content of the expandable graphite is preferably in the following range based on the total mass of the resin composition (excluding the mass of a solvent). From the viewpoint that high flame retardancy is easily imparted to the cured product, the content of the expandable graphite is preferably 2.0% by mass or more, more preferably 4.0% by mass or more, and even more preferably 8.0% by mass or more. From the viewpoint that the expandable graphite is easily dispersed in the resin composition, the content of the expandable graphite is preferably 40% by mass or less, more preferably 35% by mass or less, even more preferably less than 35% by mass, particularly preferably 30% by mass or less, extremely preferably 20% by mass or less, and highly preferably 10% by mass or less. From these viewpoints, the content of the expandable graphite is preferably 2.0% to 40% by mass, and more preferably 2.0% to 30% by mass.

(Other Additives)

The resin composition of the present embodiment can contain additives that are different from the curable component and the expandable graphite. Examples of the additives include a filler, an antifoaming agent, a flame retardant, a coupling agent, a reaction diluent, a flexibilizer, a pigment, a coloring agent, and a solvent.

Examples of the constituent material for the filler include silica, carbon black, aluminum hydroxide, magnesium hydroxide, wollastonite, aerosil, alumina, calcium carbonate, calcium silicate, mica, talc, clay, titanium white, silicon nitride, silicon carbide, graphite (excluding expandable graphite), and melamine cyanurate. Examples of the silica include crystalline silica and molten silica. From the viewpoint of excellent affinity (compatibility) with the curable component and excellent general-purpose usability, the filler preferably contains at least one selected from the group consisting of silica and aluminum hydroxide, and more preferably contains silica.

From the viewpoint that an excessive increase in the viscosity of the resin composition is suppressed, and thereby handling of the resin composition is easy (workability is easily secured), the particle size of the filler is preferably 2 µm or more, more preferably 3 µm or more, even more preferably 5 µm or more, and particularly preferably 10 µm or more. From the viewpoint that a resin composition having excellent impregnability into fine gaps is easily obtained, the particle size of the filler is preferably 30 µm or less, more preferably 20 µm or less, and even more preferably 15 µm or less. From these viewpoints, the particle size of the filler is preferably 2 to 30 µm. The particle size of the filler can be measured using a laser diffraction particle size distribution meter (manufactured by HORIBA, Ltd., trade name: LA920). It is preferable that the average particle size of the filler is also in each of these ranges.

The content of the filler is preferably in the following range based on the total mass of the resin composition (excluding the mass of a solvent). From the viewpoint that excellent strength of the cured product is easily obtained, and from the viewpoint that the moisture permeability of the cured product is low, and deterioration of the element is easily prevented when an element is sealed by the cured product, the content of the filler is preferably 30% by mass or more, more preferably 40% by mass or more, and even more preferably 50% by mass or more. From the viewpoint that an excessive increase in the viscosity of the resin composition is suppressed, and thereby handling of the resin composition is easy (workability is easily secured), the content of the filler is preferably 80% by mass or less, more preferably 70% by mass or less, and even more preferably 60% by mass or less. From these viewpoints, the content of the filler is preferably 30% to 80% by mass.

(Viscosity)

Regarding the viscosity of the resin composition when measured using a B type viscometer under the conditions of 40° C. and 60 rpm, from the viewpoint that the filling workability of the resin composition at the time of casting the resin composition is excellent, the viscosity is preferably 8.0 Pa·s or less, more preferably 7.0 Pa·s or less, even more preferably 5.0 Pa·s or less, particularly preferably 3.0 Pa·s or less, and extremely preferably 2.0 Pa·s or less. The viscosity may be, for example, 1.0 Pa·s or more.

<Molded Body>

The molded body of the present embodiment includes an element and a sealing portion that seals the element, and the sealing portion contains the resin composition of the present embodiment or a cured product thereof. Examples of the molded body include electronic components such as a capacitor (a film capacitor or the like), a chip inductor, a reactor, a transformer, a molded coil, an LSI chip, an IC chip, a sensor (a tire air pressure sensor or the like), and an engine control unit (ECU).

Figure 2:
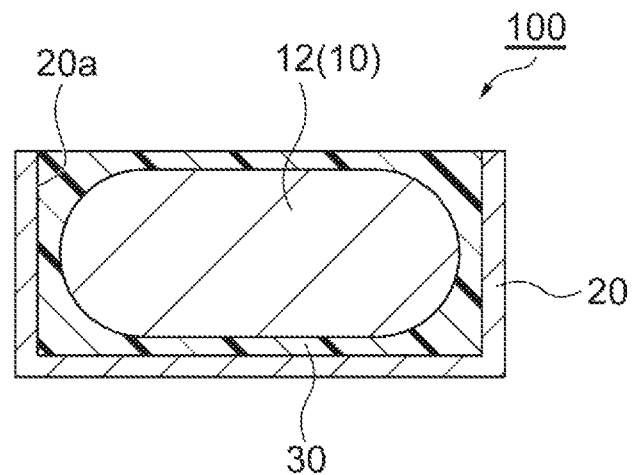
FIG. 2 is an end view illustrating the molded body of an embodiment of the present invention.
Figure 2:
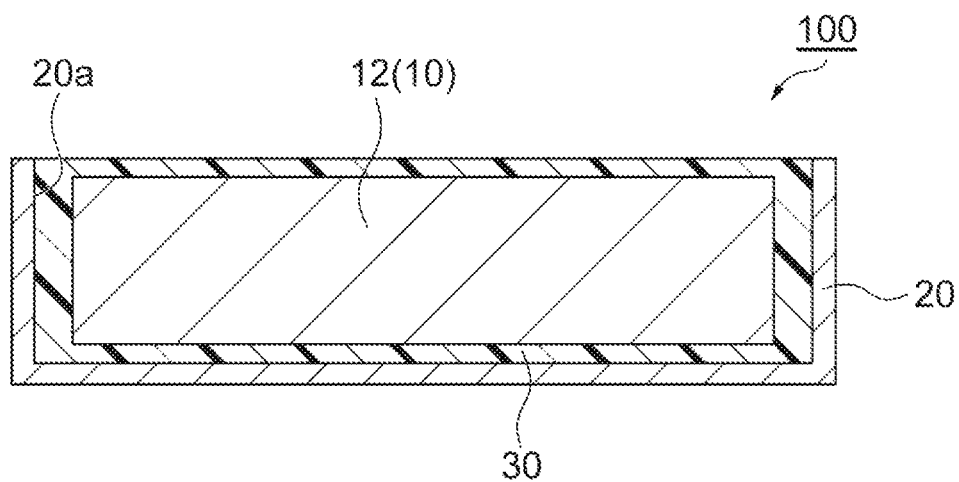

FIG. 1 is a perspective view illustrating a film capacitor as an example of the molded body of the present embodiment. FIG. 2 is an end view illustrating a film capacitor as an example of the molded body of the present embodiment. FIG. 2(a) is an end view of FIG. 1 cut along line IIa-IIa. FIG. 2(b) is an end view of FIG. 1 cut along line IIb-IIb.

A film capacitor (molded body) 100 illustrated in FIG. 1 and FIG. 2 is a case type film capacitor. The film capacitor 100 includes a film capacitor element (film capacitor rolled element) 10; an exterior case (case) 20 having a bottom and an element accommodating space 20a that accommodates the film capacitor element 10; and a sealing portion 30 that seals the film capacitor element 10 inside the element accommodating space 20a. The sealing portion 30 contains the cured product of the resin composition of the present embodiment.

The film capacitor element 10 has, for example, a rolled body 12, a metallikon electrode 14, and a lead wire 16. A method for producing the film capacitor element 10 includes, for example, a step of rolling a member obtainable by subjecting a resin film to metal vapor deposition (metalized film), and thus obtaining the rolled body 12; a step of subjecting both end faces of the rolled body 12 in a direction orthogonal to the rolling direction of the resin film, to vapor deposition (metallikon treatment) of a metal (metallikon material), and thus obtaining the metallikon electrode 14; and a step of connecting the lead wire 16 to the metallikon electrode 14. Examples of the resin film include a polyethylene terephthalate (PET) film and a polypropylene (PP) film. Examples of the metal for the metal vapor deposition include zinc, tin, and aluminum. For example, the rolled body 12 is a cylindrical body having an approximately elliptical-shaped cross-section. The metallikon electrode 14 can be formed over the respective entire surfaces of the both end faces of the rolled body 12. Examples of the metal for the metallikon electrode 14 include zinc, tin, and aluminum. Regarding the lead wire 16, for example, two lead wires are disposed on each of the both end faces of the rolled body 12, and the two lead wires 16 are disposed on each of the both end faces so as to be separated apart from each other in the longitudinal direction of the end face. For example, the lead wires 16 are connected to the metallikon electrode 14 by means of solder.

For example, the exterior case 20 has a rectangular parallelepiped shape, and has the element accommodating space 20a having a rectangular parallelepiped-shape inside thereof. In the upper part of the exterior case 20, an opening portion that is in communication with the element accommodating space 20a is formed. The exterior case 20 is formed from, for example, polyphenylene sulfide (PPS), polybutylene terephthalate (PBT), or the like. The lead wire 16 of the film capacitor element 10 extends in the opening direction of the opening portion of the exterior case 20, and the portion at the tip side of the lead wire 16 protrudes out of the element accommodating space 20a.

For example, the sealing portion 30 fills the inside of the element accommodating space 20a of the exterior case 20 so as to cover the entirety of the rolled body 12 of the film capacitor element 10 (so that the rolled body 12 is not exposed to the outside). Inside the sealing portion 30, the sealing portion 30 is interposed between the film capacitor element 10 and the bottom face of the exterior case 20, and the film capacitor element 10 is disposed to be separated apart from the bottom face of the exterior case 20. Inside the sealing portion 30, the sealing portion 30 is interposed between the film capacitor element 10 and the side wall of the exterior case 20, and the film capacitor element 10 is disposed to be separated apart from the side wall of the exterior case 20. In a case in which the sealing portion 30 is interposed between the film capacitor element 10 and the exterior case 20 as such, the film capacitor element 10 is likely to be sufficiently protected by the sealing portion 30, and therefore, the film capacitor is likely to acquire a prolonged life.

<Method for Producing Molded Body>

In the method for producing a molded body of the present embodiment, the resin composition of the present embodiment is cast, and thereby a molded body is obtained. The method for producing a molded body of the present embodiment includes, for example, a resin supplying step of supplying the resin composition of the present embodiment as a curable sealing material into a mold member (a casting mold, a frame body); and a curing step of curing the resin composition and obtaining a molded body, in this order. Examples of the molding method include vacuum casting, insert molding, injection molding, extrusion molding, and transfer molding.

As an example of the method for producing a molded body of the present embodiment, in the method for producing a film capacitor of the present embodiment, the resin composition of the present embodiment is cast, and thereby a film capacitor including a sealing portion that seals a film capacitor element is obtained. The method for producing a film capacitor of the present embodiment includes, for example, a resin supplying step of supplying the resin composition of the present embodiment as a curable sealing material into an element accommodating space of an exterior case (case); and a curing step of curing the resin composition, in this order.

In the resin supplying step, the resin composition (curable sealing material) of the present embodiment is supplied into an element accommodating space where a film capacitor element is accommodated. The resin supplying step can be carried out, for example, under the conditions of a temperature of 20° C. to 90° C. in a vacuum. In the resin supplying step, for example, the resin composition may be interposed between a film capacitor element and the bottom face of the exterior case, as the film capacitor element floats by buoyancy to the liquid surface of the resin composition concomitantly with the supply of the resin composition.

In the curing step, the resin composition supplied into the element accommodating space is cured, and thereby a cured product is obtained. In the curing step, for example, a thermosetting resin composition is heated, and thereby a cured product is obtained. The curing temperature for the resin composition is preferably 110° C. or lower. The curing step can be carried out, for example, under the conditions of 85° C. to 105° C. and 3 to 8 hours. A plurality of conditions may be combined, or heating may be carried out at one temperature and then carried out at another temperature (for example, a temperature higher than the above-described one temperature).

In the method for producing a film capacitor of the present embodiment, the resin supplying step and the curing step may be carried out repeatedly. For example, the resin composition may be cured after supplying the resin composition into the element accommodating space until the bottom part of a rolled body of a film capacitor element is immersed therein, and then, the resin composition may be further supplied into the element accommodating space, and subsequently the resin composition may be cured. That is, supplying and curing of the resin composition may be carried out several times until the entirety of the rolled body of the film capacitor element is covered. By supplying the resin composition into the element accommodating space until the bottom part of the rolled body of the film capacitor element is immersed therein, and then curing the resin composition, at the time of supplying the resin composition thereafter, the film capacitor element can be inhibited from floating by buoyancy to the liquid surface of the resin composition.

The method for producing a film capacitor of the present embodiment may also include, before the resin supplying step, an element disposition step of disposing the film capacitor element inside the element accommodating space. Furthermore, in the method for producing a film capacitor of the present embodiment, the film capacitor element may be disposed inside the element accommodating space after the resin composition is supplied into the element accommodating space.

Figure 3:
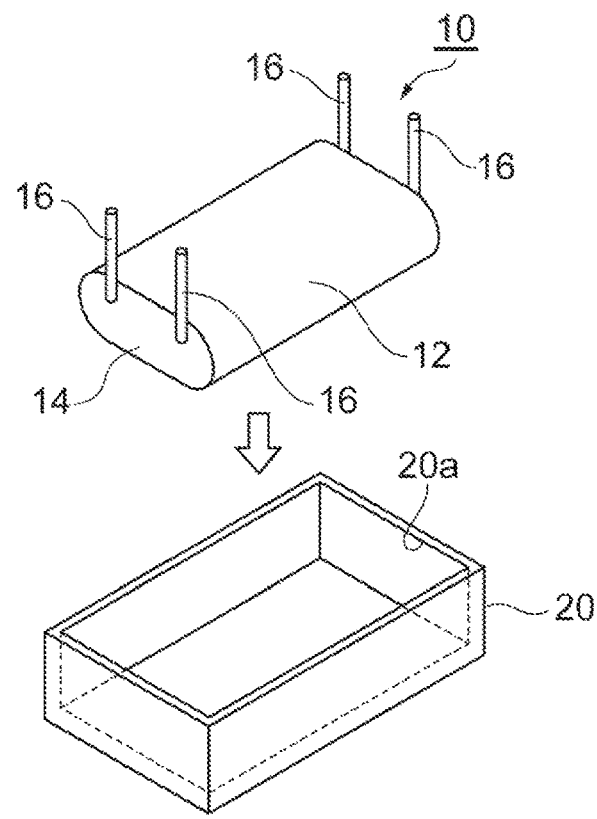
FIG. 3 is a perspective view illustrating a method for producing a molded body of an embodiment of the present invention.
Figure 3:
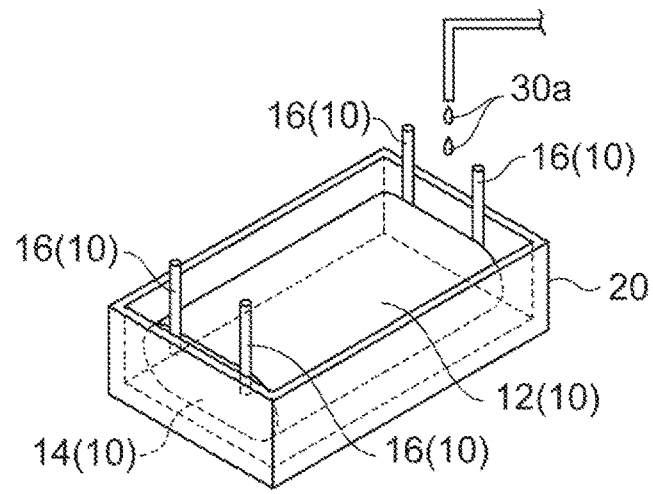
Figure 3:
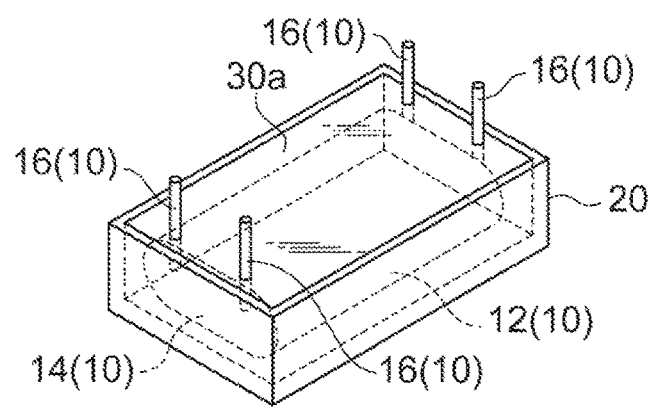

FIG. 3 is a perspective view illustrating a method for producing a film capacitor as an example of the method for producing a molded body of the present embodiment. First, as illustrated in FIG. 3(a), the film capacitor element 10 is disposed inside the element accommodating space 20a of the exterior case 20 in the element disposition step. Next, as illustrated in FIG. 3(b), a resin composition 30a as a curable sealing material is supplied into the element accommodating space 20a in the resin supplying step. Thereby, as illustrated in FIG. 3(c), the resin composition 30a fills the inside of the element accommodating space 20a. Then, in the curing step, the resin composition 30a inside the element accommodating space 20a is cured, thereby a cured product is obtained, and thus the film capacitor 100 illustrated in FIG. 1 and FIG. 2 can be obtained.

Hereinbefore, embodiments of the present invention have been described; however, the present invention is not limited to the above-mentioned embodiments. For example, an embodiment, in which the entirety of the sealing portion that seals the film capacitor element is exposed to the outside without including an exterior case, is also acceptable as long as the film capacitor includes a film capacitor element and a sealing portion that seals the film capacitor element, and the sealing portion contains a resin composition or a cured product thereof. Regarding the film capacitor element to be sealed by the sealing portion, there may be one film capacitor element, or there may be a plurality of film capacitor elements.

Inside the sealing portion of the film capacitor, the film capacitor element may be in contact with the bottom face of the exterior case, without having the sealing portion interposed between the film capacitor element and the bottom face of the exterior case. Inside the sealing portion, the film capacitor element may be in contact with the side wall of the exterior case, without having the sealing portion interposed between the film capacitor element and the side wall of the exterior case.

The film capacitor element is not particularly limited as long as it has a film main body (a capacitor main body, a film element main body) formed from a film. For example, the film capacitor element may have a laminated body of films (film structure formed by laminating films), instead of a rolled body of a film (film structure formed by rolling a film). Regarding the film main body, a rolled body or a laminated body of a metalized film can be used.

EXAMPLES

Hereinafter, the content of the present invention will be described in more detail by using Examples and Comparative Examples; however, the present invention is not limited to the following Examples.

<Preparation of Resin Composition>

The following components shown in Table 1 and Table 2 were mixed, and thereby resin compositions were prepared.

(Thermosetting Resin)
  Bisphenol A type epoxy resin, manufactured by Mitsui Chemicals, Inc., trade name: EPOMIK R-139S
  Bisphenol A type epoxy resin, manufactured by Mitsubishi Chemical Corporation, trade name: JER834

(Curing Agent)
  Acid anhydride, 3- or 4-methyl-1,2,3,6-tetrahydrophthalic anhydride, manufactured by Hitachi Chemical Company, Ltd., trade name: HN-2000

(Curing Accelerator)
  Benzalkonium chloride, manufactured by NOF CORPORATION, trade name: M2-100R (Expandable Graphite)
  (trade name) GREP-EG, manufactured by SUZUHIRO CHEMICAL CO., LTD., average major axis: 600 μm
  (trade name) EXP-100S, manufactured by Fuji Graphite Industry Co., Ltd., average major axis: 200 μm
(Filler)
  Melamine cyanurate, manufactured by Nissan Chemical Corporation, trade name: MC-4000, average particle size: 14 μm
  Carbon black, coloring agent, manufactured by Mitsubishi Chemical Corporation, trade name: MA-100
  Crystalline silica, manufactured by FUMITEC, trade name: HC-15, average particle size: 12.8 μm
  Crystalline silica, manufactured by Sibelco Japan, Ltd., trade name: CA0040, average particle size: 3.65 μm
  Aluminum hydroxide, manufactured by Nippon Light Metal Company, Ltd., trade name: AL-B143, average particle size: 5 μm
  Magnesium hydroxide, manufactured by Konoshima Chemical Co., Ltd., trade name: N-6, average particle size: 1.3 μm
(Other Additives)
  Antifoaming agent, silicone-based antifoaming agent, manufactured by Shin-Etsu Chemical Co., Ltd., trade name: KS-603
  Coupling agent, epoxy group-containing silane coupling agent, manufactured by Dow Corning Corp., trade name: OFS-6040
  Flame retardant, ammonium polyphosphate, manufactured by DAIHACHI CHEMICAL INDUSTRY CO., LTD., trade name: TCP
  Flame retardant, ammonium polyphosphate, manufactured by Clariant Chemicals, Ltd., trade name: Exolit AP 462

<Measurement of Physical Properties>

The following physical properties were measured using the above-described resin compositions. The measurement of the physical properties was carried out rapidly after mixing the above-mentioned curing agent and other components. The results of the measurement of the physical properties are presented in Table 1 and Table 2.

(Water Absorption Rate)

20 g of each of the above-described resin compositions was injected into an aluminum Petri dish having a diameter of 60 mm. Next, the resin composition was thermally cured for 8 hours at 105° C., thereby a cured product was obtained, and then the mass of the cured product was measured. Subsequently, the cured product was caused to absorb water for 37 hours under the conditions of 121° C., 100% RH, and 2 atm, and then the mass of the cured product was measured. The water absorption rate of the cured product was calculated by the following formula.

Water absorption rate (% by mass)=(Mass after water absorption−mass before water absorption)/mass before water absorption (Viscosity)

Using a B type rotary viscometer (manufactured by Tokimec, Inc., trade name: BL), the viscosity of the resin composition was measured under the conditions of a temperature of 40° C. and a speed of rotation of 60 rpm (60 rotations). The temperature was adjusted using a constant temperature tank (manufactured by Yamato Scientific Co., Ltd., trade name: BF600).

(Flame Retardancy)

The resin composition was thermally cured for 8 hours at 105° C. to obtain a cured product, and then, the cured product was processed into a rectangular parallelepiped shape having a size of 125 mm in length×13.0 mm in width and a thickness of 5 mm, and thereby a specimen was obtained. Using the specimen, flame retardancy was evaluated according to the testing method of UL94V. According to the determination criteria of UL94V, flame contact in the lower part was rated in four grades of "V-0", "V-1", "V-2", and "V-NOT" (unclassifiable). "V-0" represents the highest flame retardancy, and flame retardancy decreases in the order of "V-1", "V-2", and "V-NOT".

(Thermomechanical Analysis: TMA)

The resin composition was thermally cured for 8 hours at 105° C. to obtain a cured product, and then, the cured product was processed into a rectangular parallelepiped shape having a size of 5 mm in length×5 mm in width and a thickness of 3 mm, and thereby a specimen was obtained. A thermal expansion curve was obtained by performing a measurement using a thermomechanical analyzer (compression TMA measuring apparatus, manufactured by Rigaku Corporation, trade name: TMA8310) under the conditions of a rate of temperature increase of 10° C./min, 40° C. to 180° C., and a load of 5 N. The glass transition temperature (Tg, unit: ° C.) of the specimen was determined from the bending curve of the thermal expansion curve. Furthermore, the coefficient of linear expansion (al, unit: ppm) was determined from the gradient of a region of lower temperature than the glass transition temperature.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Thermosetting resin | R-139S | 25.0 | 25.0 | 25.0 | 25.0 | 25.0 | 25.0 | 25.0 | 25.0 | 25.0 | 25.0 | 25.0 | 25.0 |
| | JER834 | 3.0 | 3.0 | 3.0 | 3.0 | 3.0 | 3.0 | 3.0 | 3.0 | 3.0 | 3.0 | 3.0 | 3.0 |
| Curing agent | HN-2000 | 22.0 | 22.0 | 22.0 | 22.0 | 22.0 | 22.0 | 22.0 | 22.0 | 22.0 | 22.0 | 22.0 | 22.0 |
| Curing accelerator | M2-100R | 0.22 | 0.22 | 0.22 | 0.22 | 0.22 | 0.22 | 0.22 | 0.22 | 0.22 | 0.22 | 0.22 | 0.22 |
| Expandable graphite | GREP-EG | 10.0 | 2.5 | 2.5 | | | | | | | | | |
| | EXP-100S | | | | 2.5 | 3.0 | 4.0 | 5.0 | 3.0 | 3.0 | 3.0 | 3.0 | 4.0 |
| Filler Melamine cyanurate | MC-4000 | | | | | | | | | 2.0 | 3.0 | 4.0 | 2.0 | 1.0 |
| Carbon black | MA-100 | | | | | | | | | | | | | |

TABLE 1-continued

|  |  | Example |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Crystalline | HC-15 | 30.0 | 70.0 | 25.0 | 25.0 | 35.0 | 35.0 | 35.0 | 35.0 | 35.0 | 70.0 | 15.0 | 35.0 |
| silica | CA0040 | 30.0 |  | 25.0 | 25.0 | 35.0 | 35.0 | 35.0 | 35.0 | 35.0 |  | 55.0 | 35.0 |
| Aluminum hydroxide | AL-B143 |  |  |  | 20.0 | 20.0 |  |  |  |  |  |  |  |
| Magnesium hydroxide | N-6 |  |  |  |  |  |  |  |  |  |  |  |  |
| Antifoaming agent | KS-603 | 0.01 | 0.01 | 0.01 | 0.01 | 0.01 | 0.01 | 0.01 | 0.01 | 0.01 | 0.01 | 0.01 | 0.01 |
| Coupling agent | OFS-6040 | 0.3 | 0.3 | 0.3 | 0.3 | 0.3 | 0.3 | 0.3 | 0.3 | 0.3 | 0.3 | 0.3 | 0.3 |
| Flame retardant | TCP |  |  |  |  |  |  |  |  |  |  |  |  |
|  | Exolit AP 462 |  |  |  |  |  |  |  |  |  |  |  |  |
| Total amount of all components [parts by mass] |  | 120.53 | 123.03 | 123.03 | 123.03 | 123.53 | 124.53 | 125.53 | 125.53 | 126.53 | 127.53 | 125.53 | 125.53 |
| Water absorption rate [% by mass] |  | 1.06 | 0.97 | 1.11 | 1.10 | 0.95 | 0.99 | 1.03 | 0.93 | 0.94 | 0.93 | 0.93 | 0.94 |
| Viscosity | 60 rotations [Pa · s] | 1.5 | 1.3 | 1.8 | 2.1 | 2.4 | 2.9 | 4.1 | 3.9 | 4.5 | 4.8 | 4.7 | 3.5 |
| Flame retardancy |  | V-0 | V-0 | V-0 | V-0 | V-0 | V-0 | V-0 | V-0 | V-0 | V-0 | V-0 | V-0 |
| TMA | Tg [° C.] | 113 | 118 | 119 | 117 | 118 | 118 | 119 | 118 | 119 | 119 | 118 | 119 |
|  | α1 [ppm] | 45 | 36 | 44 | 38 | 32 | 31 | 31 | 32 | 31 | 33 | 32 | 31 |

TABLE 2

|  |  | Comparative Example |  |  |  |  |
|---|---|---|---|---|---|---|
|  |  | 1 | 2 | 3 | 4 | 5 |
| Thermosetting resin | R-139S | 25.0 | 25.0 | 25.0 | 25.0 | 25.0 |
|  | JER834 | 3.0 | 3.0 | 3.0 | 3.0 | 3.0 |
| Curing agent | HN-2000 | 22.0 | 22.0 | 22.0 | 22.0 | 22.0 |
| Curing accelerator | M2-100R | 0.22 | 0.22 | 0.22 | 0.22 | 0.22 |
| Expandable graphite | GREP-EG |  |  |  |  |  |
|  | EXP-100S |  |  |  |  |  |
| Filler Melamine cyanurate | MC-4000 |  |  |  |  |  |
| Carbon black | MA-100 |  | 0.02 | 0.02 | 0.02 | 0.02 |
| Crystalline | HC-15 | 35.0 |  |  | 25.0 | 25.0 |
| silica | CA0040 | 35.0 |  |  | 25.0 | 25.0 |
| Aluminum hydroxide | AL-B143 |  |  | 70.0 | 20.0 | 20.0 |
| Magnesium hydroxide | N-6 |  | 70.0 |  |  |  |
| Antifoaming agent | KS-603 | 0.01 | 0.01 | 0.01 | 0.01 | 0.01 |
| Coupling agent | OFS-6040 | 0.3 | 0.3 | 0.3 | 0.3 | 0.3 |
| Flame retardant | TCP |  |  |  | 18.0 |  |
|  | Exolit AP 462 |  |  |  |  | 6.0 |
| Total amount of all components [parts by mass] |  | 120.55 | 120.55 | 120.55 | 138.55 | 126.55 |
| Water absorption rate [% by mass] |  | 1.11 | 2.83 | 3.10 | 1.05 | 2.16 |
| Viscosity | 60 rotations [Pa ·s] | 1.1 | 3.6 | 5.2 | 3.5 | 4.7 |
| Flame retardancy |  | V-NOT | V-0 | V-0 | V-0 | V-0 |
| TMA | Tg [° C.] | 126 | 121 | 119 | 67 | 120 |
|  | α1 [ppm] | 36 | 43 | 43 | 116 | 42 |

As shown in Table 1 and Table 2, in the respective Examples in which expandable graphite was used, cured products having low water absorption rates while having excellent flame retardancy and heat resistance are obtained. In the respective Comparative Examples in which expandable graphite was not used, result of inferior flame retardancy (Comparative Example 1), results of high water absorption rates of cured products (Comparative Examples 2, 3, and 5), or result of low heat resistance (Comparative Example 4) are obtained. Furthermore, in the respective Examples, low viscosity of the resin compositions is maintained without using a solvent.

REFERENCE SIGNS LIST

10: film capacitor element, 12: rolled body, 14: metallikon electrode, 16: lead wire, 20: exterior case, 20a: element accommodating space, 30: sealing portion, 30a: resin composition, 100: film capacitor (molded body).

The invention claimed is:
1. A resin composition for casting, comprising:
a curable component comprising a curable resin and a curing agent, wherein the curing agent includes an acid anhydride;
expandable graphite, wherein a major axis of the expandable graphite is 800 μm or less; and a filler containing silica, wherein a viscosity in a case in which the viscosity is measured using a B type viscometer under conditions of 40° C. and 60 rpm is 8.0 Pa·s or less, wherein a content of silica is 30% by mass or more based on a total mass of the resin composition excluding the mass of solvent, and wherein a content of the curing agent is 15% to 55% by mass based on the total mass of the resin composition excluding the mass of solvent.

2. The resin composition according to claim 1, wherein the curable component includes an epoxy resin.

3. A cured product of the resin composition according to claim 1.

4. A molded body comprising: an element and a sealing portion that seals the element, wherein the sealing portion contains the resin composition according to claim 1 or a cured product thereof.

5. A method for producing a molded body, the method comprising casting the resin composition according to claim 1 to obtain a molded body.

6. A film capacitor comprising: a film capacitor element and a sealing portion that seals the film capacitor element, wherein the sealing portion contains the resin composition according to claim 1 or a cured product thereof.

7. A method for producing a film capacitor, the method comprising casting the resin composition according to claim 1 to obtain a film capacitor comprising a sealing portion that seals a film capacitor element.

8. The resin composition according to claim 1, wherein a major axis of the expandable graphite is more than 200 μm.

9. The resin composition according to claim 1, wherein a content of the expandable graphite is less than 35% by mass.

10. The resin composition according to claim 1, wherein the curable component includes a thermosetting resin.

11. The resin composition according to claim 1, wherein the filler further contains aluminum hydroxide.

12. The resin composition according to claim 1, wherein the filler further contains melamine cyanurate.

13. The resin composition according to claim 1, wherein an average particle size of the filler is 2 to 30 μm.

14. The resin composition according to claim 1, wherein a content of the filler is 30% to 80% by mass.

15. The resin composition according to claim 1, wherein a major axis of the expandable graphite is 500 μm or less and the curable component includes a thermosetting resin.

16. The resin composition according to claim 1, wherein a content of the expandable graphite is less than 35% by mass and the curable component includes a thermosetting resin.

17. A resin composition for casting, comprising:

a curable component, wherein the curable component includes a thermosetting resin and a curing agent, wherein the curing agent includes an acid anhydride;

expandable graphite; and a filler containing silica, wherein a viscosity in a case in which the viscosity is measured using a B type viscometer under conditions of 40° C. and 60 rpm is 8.0 Pa·s or less, wherein a content of silica is 30% by mass or more based on a total mass of the resin composition excluding the mass of solvent, and wherein a content of the curing agent is 15% to 55% by mass based on the total mass of the resin composition excluding the mass of solvent.

* * * * *